(12) United States Patent
Hsu et al.

(10) Patent No.: US 11,396,898 B2
(45) Date of Patent: Jul. 26, 2022

(54) SCREW WITH HOLE-ENLARGING PORTION

(71) Applicants: Kuo-Tai Hsu, Tainan (TW); Ming-Hao Hsu, Tainan (TW)

(72) Inventors: Kuo-Tai Hsu, Tainan (TW); Ming-Hao Hsu, Tainan (TW)

( * ) Notice: Subject to any disclaimer, the term of this patent is extended or adjusted under 35 U.S.C. 154(b) by 343 days.

(21) Appl. No.: 16/745,467

(22) Filed: Jan. 17, 2020

(65) Prior Publication Data
US 2021/0222722 A1 Jul. 22, 2021

(51) Int. Cl.
*F16B 25/10* (2006.01)
*F16B 25/00* (2006.01)

(52) U.S. Cl.
CPC ........ *F16B 25/103* (2013.01); *F16B 25/0057* (2013.01); *F16B 25/0084* (2013.01); *F16B 25/0015* (2013.01)

(58) Field of Classification Search
CPC ..... F16B 25/10; F16B 25/103; F16B 25/0057
USPC ............................................ 411/387.2, 387.8
See application file for complete search history.

(56) References Cited

U.S. PATENT DOCUMENTS

| | | | | |
|---|---|---|---|---|
| 4,874,278 A * | 10/1989 | Kawashita | .......... | F16B 25/0015 411/386 |
| 5,015,134 A * | 5/1991 | Gotoh | ................. | F16B 25/0015 411/413 |
| 6,000,892 A * | 12/1999 | Takasaki | ............. | F16B 25/0015 411/413 |
| 6,616,391 B1 * | 9/2003 | Druschel | ............. | F16B 25/0015 411/399 |
| 9,850,935 B2 | 12/2017 | Shih | | |
| 2007/0237606 A1 * | 10/2007 | Takasaki | ................. | F16B 25/10 411/387.2 |
| 2016/0061247 A1 * | 3/2016 | Gong | .................... | F16B 25/103 411/387.2 |
| 2017/0284447 A1 * | 10/2017 | Falkenstein | ......... | F16B 25/0015 |
| 2018/0266467 A1 * | 9/2018 | Lin | ..................... | F16B 25/0026 |
| 2019/0186527 A1 * | 6/2019 | Shih | ...................... | F16B 25/103 |
| 2019/0390700 A1 * | 12/2019 | Iyer | ....................... | F16B 35/065 |
| 2020/0056647 A1 * | 2/2020 | Su | ....................... | F16B 25/0052 |
| 2020/0173481 A1 * | 6/2020 | Lajewardi | .......... | F16B 25/0084 |
| 2020/0386256 A1 * | 12/2020 | Dissing | ............... | F16B 25/0078 |

* cited by examiner

*Primary Examiner* — Gary W Estremsky
(74) *Attorney, Agent, or Firm* — Alan D. Kamrath; Karin L. Williams; Mayer & Williams PC

(57) ABSTRACT

A screw includes a head and a shank extending from the head, and a hole-enlarging portion formed on the shank. The hole-enlarging portion features no thread and a substantially triangular transverse section. The hole-enlarging portion includes three inclined edges spaced from one another in the circumferential direction of the shank, and a guiding slope is formed between two adjacent inclined edges. The shank defines a longitudinal axis and is provided with a thread. Each inclined edge extends toward the head in an inclined direction relative to a horizontal axis perpendicular to the longitudinal axis. The inclined direction of each inclined edge is identical to a direction in which the thread extends toward the head.

10 Claims, 7 Drawing Sheets

SCREW WITH HOLE-ENLARGING PORTION

BACKGROUND OF THE INVENTION

1. Field of the Invention

The present invention relates to a screw and, more particularly, to a screw with a hole-enlarging portion.

2. Description of the Related Art

A hole expanding screw as disclosed in the U.S. Pat. No. 9,850,935 includes a screw head and a screw shank. The screw head includes a top and a neck extending from the top. The screw shank includes a shank body connected with the neck, a hole expanding portion connected with the shank body, a cone connected with the hole expanding portion, and a thread running helically from the cone through the hole expanding portion to the shank body. The outer diameter of the hole expanding portion is greater than the diameter of the shank body and smaller than the diameter of the thread. The hole expanding portion includes a plurality of hole expanding blocks arranged in rows and a plurality of debris exhaust channels among the hole expanding blocks, wherein two neighboring rows of the hole expanding blocks are arranged in a staggered way. Accordingly, when the hole expanding screw is being screwed in a workpiece, a hole with a diameter greater than the diameter of the shank body but less than the diameter of the thread is drilled by the hole expanding blocks such that the hole expanding screw keeps moving inside the workpiece easily with debris generated by the hole expanding portion expelled through the debris exhaust channels to prevent the debris from accumulating and cracking the workpiece.

However, the issues of high resistance and poor debris removals in the course of the hole expanding screw driven into the workpiece still exist. Specifically, when the hole expanding screw is being driven into a hole, a stronger torsion should be applied to the hole expanding portion with a circular cross section, which increases a contact area between the hole expanding portion and a hole wall of the hole. Moreover, more debris will be generated at a position at which the hole expanding portion with a larger cutting area is screwed in the workpiece. When excessive debris is accumulated in the guiding path of the thread with which the hole expanding portion is screwed in the workpiece, some debris will block off space between the thread and the workpiece, hindering the advancement of the screw shank in the hole and causing the screw to be jammed in the workpiece. Furthermore, a crack is generated on the squeezed workpiece in which the screw shank is hardly or slowly driven inside the hole.

BRIEF SUMMARY OF THE INVENTION

It is an objective of the present invention to provide a screw with a hole-enlarging portion through which hole reaming and chip stirring are promoted effectively for easier operation, better chip stirring and faster screw-in speed of the screw that is being driven into a workpiece.

To achieve this and other objectives, a screw of the present invention includes a head, a shank and a hole-enlarging portion. The shank extends from the head and defines a longitudinal axis. The shank has a shank diameter and is provided with a first thread defining a major diameter greater than the shank diameter. The hole-enlarging portion is designed on the shank and features no thread thereon. The hole-enlarging portion has an approximately triangular transverse section and includes three inclined edges spaced from one another along a circumferential direction of the shank.

The three inclined edges defines an edge top diameter based on their edge tops and being greater than the shank diameter. A guiding slope is defined between two adjacent inclined edges. Each inclined edge obliquely extends toward the head relative to a horizontal axis perpendicular to the longitudinal axis. The direction in which each inclined edge extends toward the head is identical to a direction in which the first thread extends toward the head. A tilt angle at which each inclined edge extends toward the head is greater than a tilt angle at which the first thread extends toward the head.

In an embodiment, the screw further includes a screw-in portion designed at a tail end of the shank. The shank includes a front section and a rear section spaced from the front section along the longitudinal axis. The front section is situated between the rear section and the screw-in portion, and the hole-enlarging portion is designed at the front section of the shank and adjacent to the screw-in portion.

In an embodiment, the hole-enlarging portion is situated between the first thread and the screw-in portion, and a second thread is formed on the screw-in portion. Each inclined edge has a top end spaced from or extending to the first thread and has a bottom end spaced from or extending to the second thread of the screw-in portion.

In an embodiment, the screw-in portion is a drilling tail end with cutting edges. Each inclined edge has a top end spaced from or extending to the first thread and has a bottom end spaced from or extending to the cutting edges of the drilling tail end.

In an embodiment, each inclined edge has a triangular transverse section and includes two lateral sides and a blade-like outer edge connecting the lateral sides.

In an embodiment, the guiding slope is an inward recess through which a discharging groove is formed.

The present invention will become clearer in light of the following detailed description of illustrative embodiments of this invention described in connection with the drawings.

DETAILED DESCRIPTION OF THE INVENTION

Figure 1:
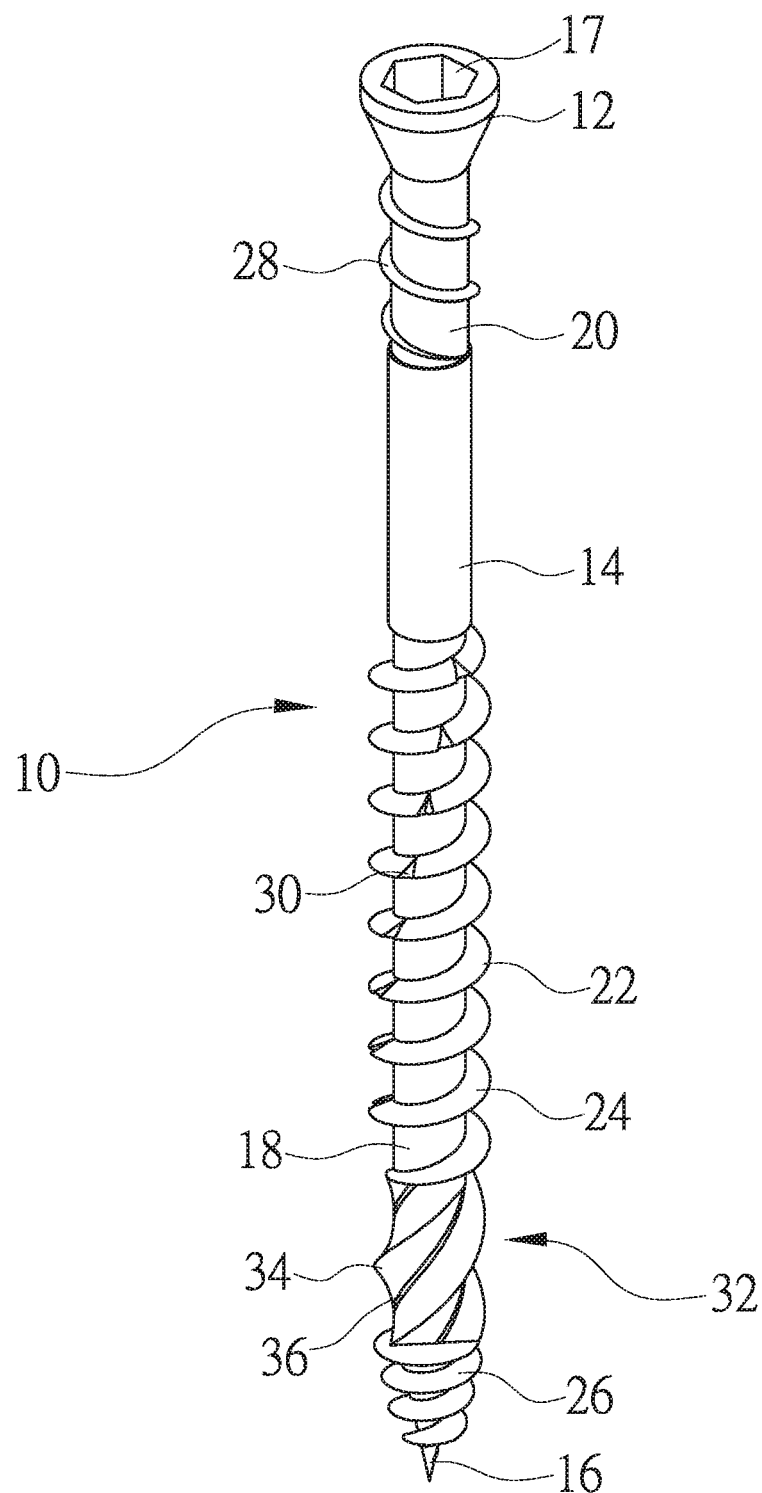
FIG. 1 is a perspective view of a screw according to a first embodiment of the present invention.
Figure 2:
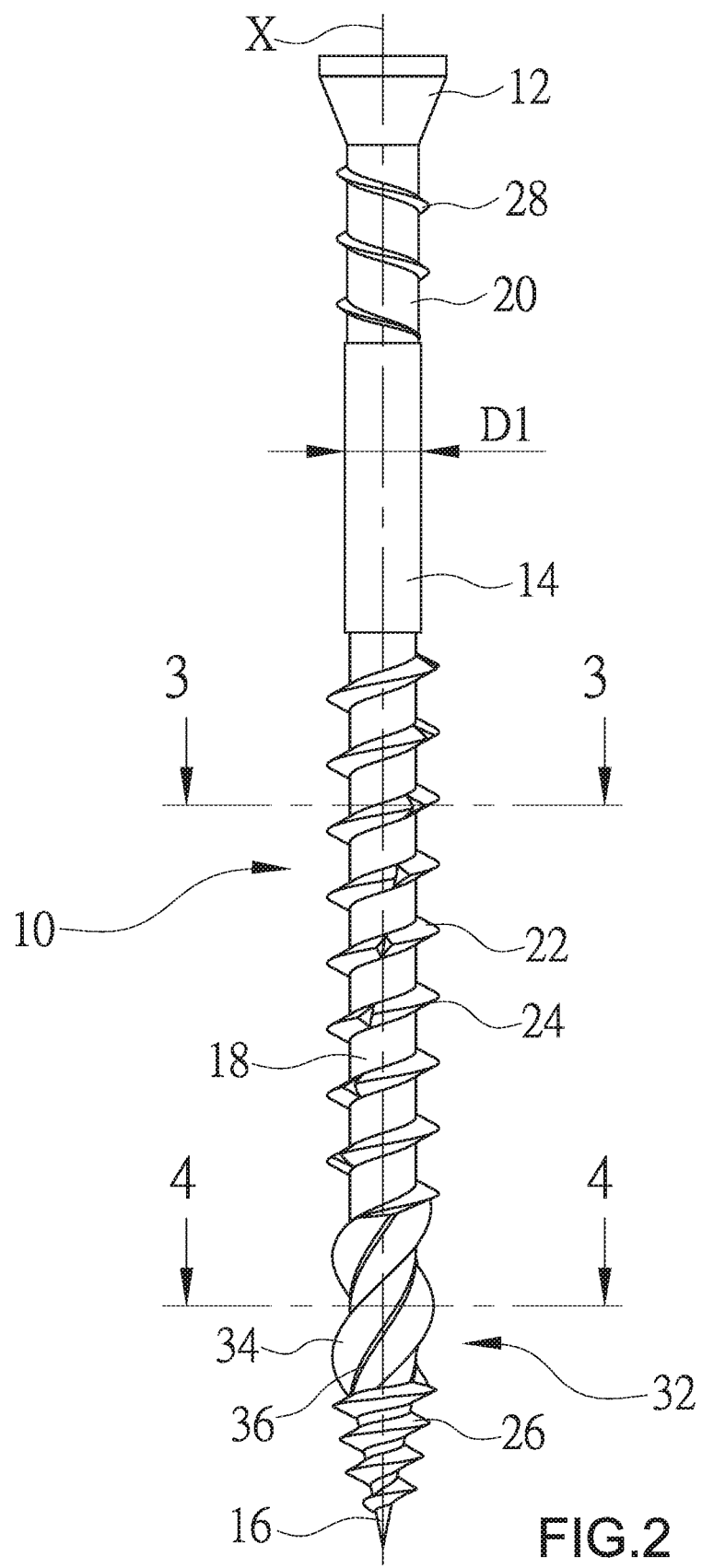
FIG. 2 is a plane view of the screw in FIG. 1.
Figure 3:
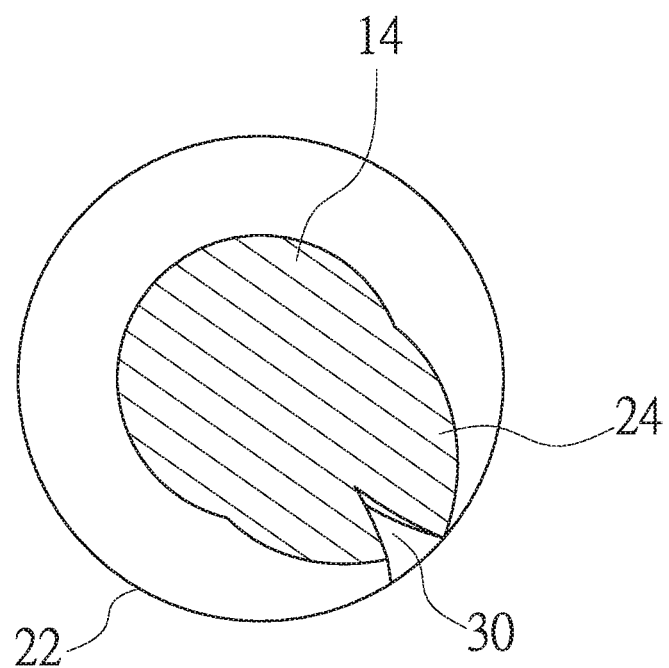
FIG. 3 is a sectional view taken along line 3-3 of FIG. 2.

A screw 10 according to a first embodiment of the present invention is shown in FIGS. 1 through 5 of the drawings and includes a head 12, a shank 14 extending from a lower end of the head 12, and a screw-in portion 16 formed at a tail end of the shank 14. A socket 17 is disposed in an upper surface of the head 12 for a tool (not shown) to insert into for driving the screw 10 to rotate. The shank 14 defines a longitudinal axis X and includes a front section 18 and a rear section 20 spaced from the front section 18 along the longitudinal axis X and connected to the head 12. The front section 18 is situated between the rear section 20 and the screw-in portion 16. The shank 14 features a circular transverse section at which a shank diameter D1 is defined. At least one thread is provided on the shank 14. In this embodiment, the shank 14 is provided with a first thread 22 located at the front section 18 and including a plurality of first thread convolutions 24 from which a major diameter D2 greater than the shank diameter D1 is defined based on their crest. The first thread 22 is a right-hand thread slantwise upward extending from left to right. The screw-in portion 16 is a sharp tail around which a second thread 26 is formed. In a feasible embodiment, the screw-in portion 16 may be a drilling tail end with cutting edges (not shown in figures). In this embodiment, the shank 14 is further provided with a third thread 28 located at the rear section 20 and featuring a direction of upward helix contrary to a direction of upward helix of the first thread 22. The first thread convolutions 24 are provided with notches 30 from which remnant chips are guided.

Figure 4:
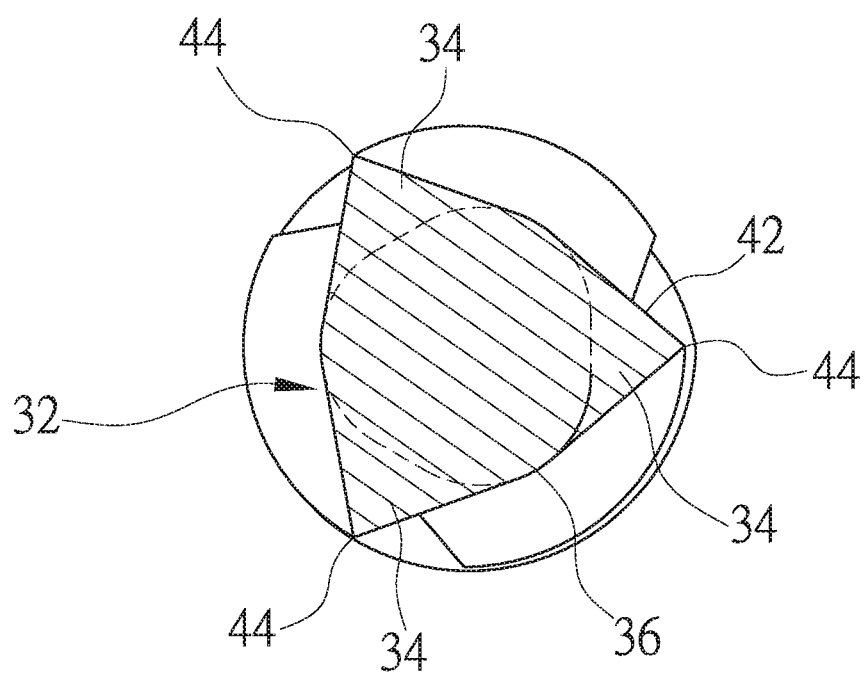
FIG. 4 is a sectional view taken along line 4-4 of FIG. 2.

The screw 10 is characteristic of the shank 14 on which an unthreaded hole-enlarging portion 32 with an approximately triangular transverse section is designed (see FIG. 4). The hole-enlarging portion 32 includes three inclined edges 34 spaced from one another along a circumferential direction of the shank 14 for development of an approximately triangular sectional profile at the hole-enlarging portion 32. Two adjacent inclined edges 34 are spaced 120 degrees apart along the circumferential direction of the shank 14 for development of a guiding slope 36 therebetween. In a feasible embodiment, the guiding slope 36 is an inclined plane or an inward recess through which a discharging groove is formed.

Each inclined edge 34 extends obliquely toward the head 12 relative to a horizontal axis H perpendicular to the longitudinal axis X for development of a helix segment. The upward direction in which each inclined edge 34 extends toward the head 12 is identical to the upward direction (from left to right) in which the first thread 22 extends toward the head 12. A tilt angle (A1) at which each inclined edge 34 extends toward the head 12 is greater than a tilt angle (A2) at which the first thread 22 extends toward the head 12.

Figure 5:
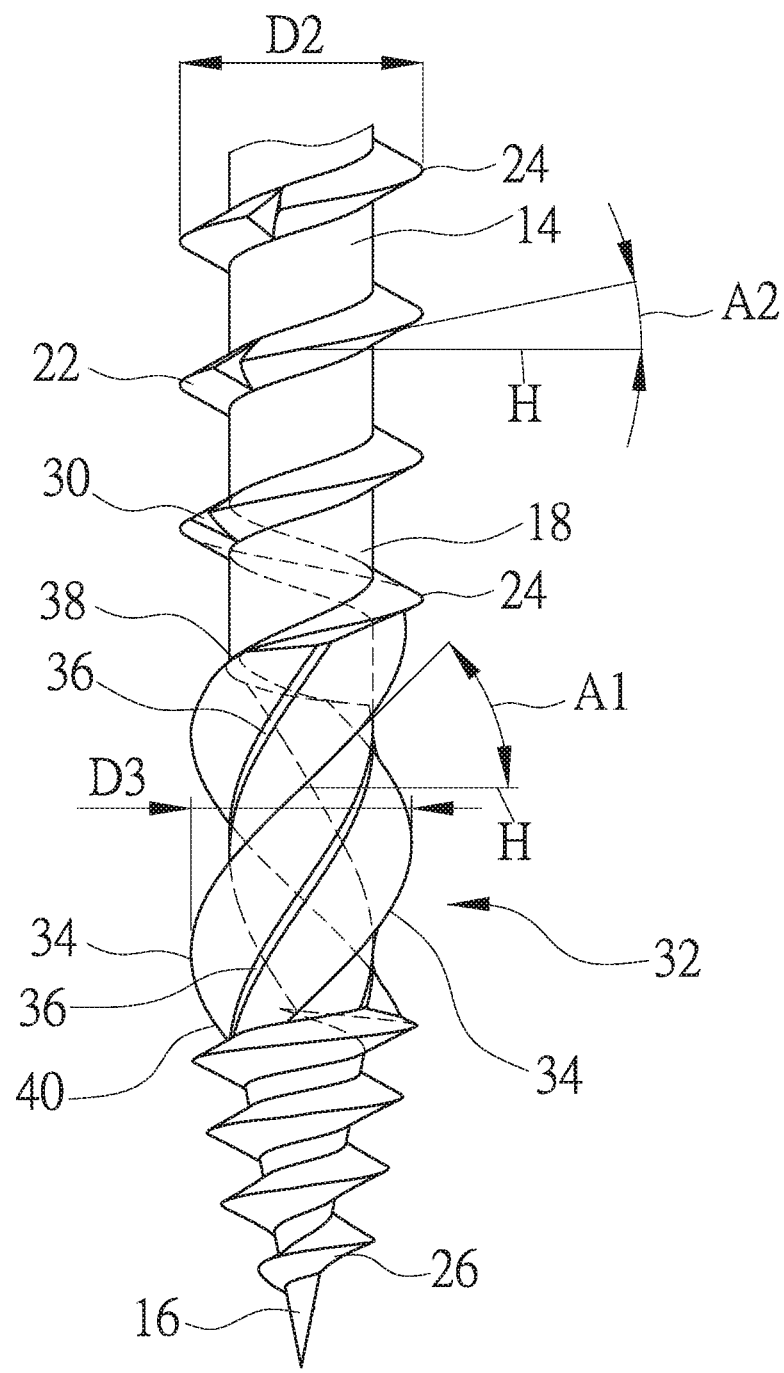
FIG. 5 is a partial enlarged view of the screw in FIG. 2.

In this embodiment, the hole-enlarging portion 32 is designed at the front section 18 of the shank 14 and situated between the first thread 22 and the screw-in portion 16 (see FIG. 5). Each inclined edge 34 has a top end 38 extending to the first thread convolution 24 at the lowest end of the first threads 22 and has a bottom end 40 extending to the second thread 26 of the screw-in portion 16. Each inclined edge 34 with a triangular transverse section has two lateral sides 42 and a blade-like outer edge 44 connecting the lateral sides 42 (see FIG. 4). The three inclined edges 34 define an edge top diameter D3 based on their edge tops, and the edge top diameter D3 is greater than the shank diameter D1 but slightly less than or equal to the major diameter D2.

In practice, the screw 10 based on the screw-in portion 16 as an anchor point for cutting is inserted into a workpiece (not shown in figures). With the head 12 driven to rotate by a tool, the workpiece is cut and drilled by the second thread 26 at the screw-in portion 16 for creating a hole. The hole wall inside the hole is cut and reamed by the inclined edges 34 at the hole-enlarging portion 32. Remnant chips generated from the enlarged hole are guided and removed upward along the guiding slopes 36 such that the following first thread 22 is screwed in the workpiece smoothly for higher screw-in speed and easy operation.

Because the hole-enlarging portion 32 which is being screwed in the enlarged hole is a non-threaded portion but characteristic of a triangular transverse section, remnant chips cut by both the screw-in portion 16 and the inclined edges 34 are removed smoothly and guided upward through the guiding slopes 36 without restriction or resistance and filled in gaps between the shank 14 and the hole wall uniformly for effective reaming and chip stirring, faster screw-in speed of the screw 10, and fewest cracks on the squeezed workpiece. Moreover, because the inclined edges 34 at the hole-enlarging portion 32 are spaced 120 degrees apart along the circumferential direction of the shank 14, the screw 10, which is being screwed in the workpiece and sustaining stresses distributed unevenly, still moves in the screw-in direction corrected by the three inclined edges 34 for neither sway nor deflection of the first thread 22 simultaneously, easy operation and better occlusion of the screw 10 in the workpiece.

Figure 6:
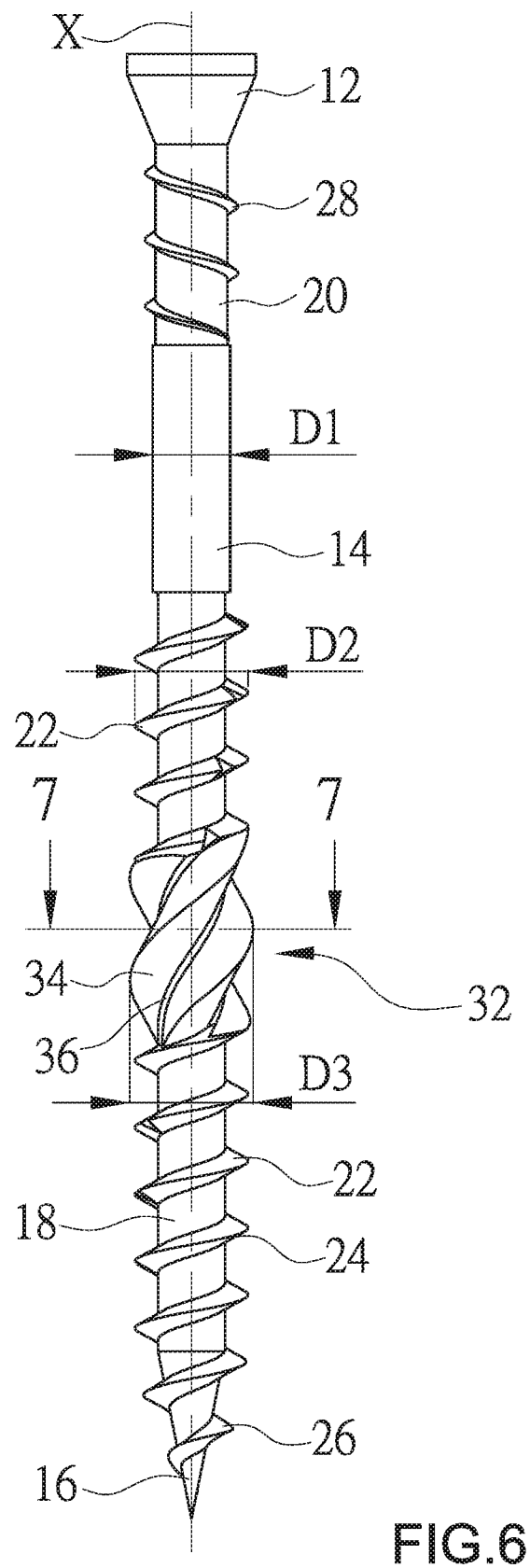
FIG. 6 is a plane view of a screw according to a second embodiment of the present invention.
Figure 7:
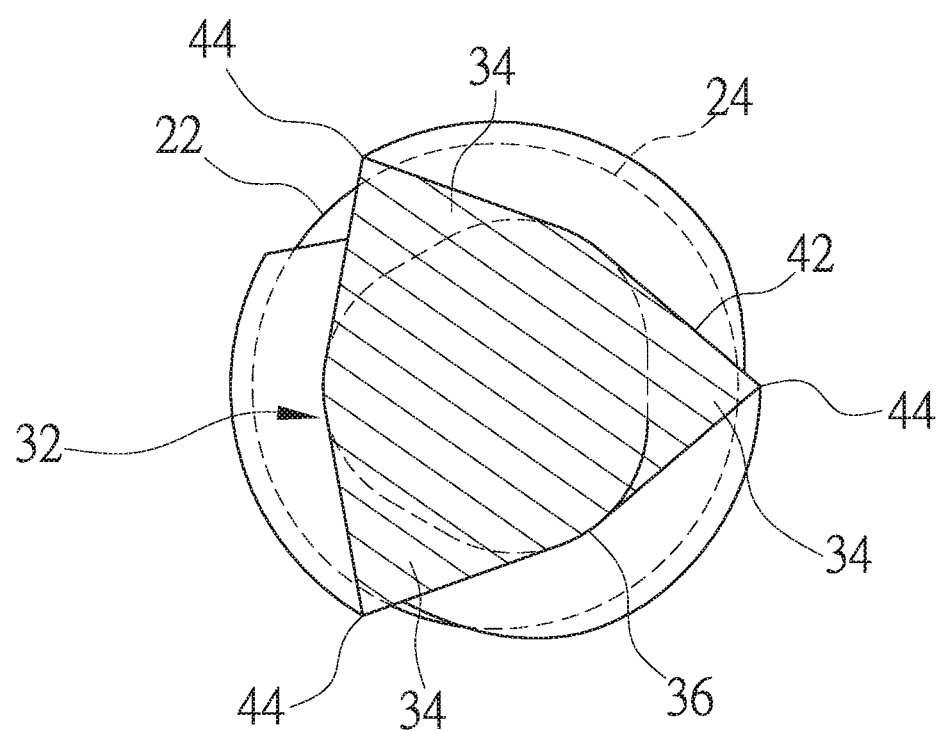
FIG. 7 is a sectional view taken along line 7-7 of FIG. 6.

FIG. 6 and FIG. 7 illustrate a screw 10 according to a second embodiment of the present invention modified from the first embodiment. In this embodiment, the hole-enlarging portion 32 is designed at the middle segment of the shank 14, and the edge top diameter D3 is slightly greater than the major diameter D2. It should be mentioned that the hole-enlarging portion 32 of the present invention is rolled from the shank 14 directly and manufactured easily for a controllable size of the edge top diameter D3 as required. When the screw 10 is used to fasten a workpiece moderately, the edge top diameter D3 can be greater than the major diameter D2. Accordingly, when a hole is enlarged by the inclined edges 34 at the hole-enlarging portion 32, both the first thread 22 and the third thread 28 on the shank 14 are screwed in the workpiece easily. In a feasible embodiment, the hole-enlarging portion 32 of the present invention can be designed at the rear section 20 of the shank 14, so that the head 12 can be more easily screwed into a workpiece.

The scope of the invention be indicated by the appended claims, rather than by the foregoing description, and all changes which come within the meaning and range of equivalency of the claims are intended to be embraced therein.

The invention claimed is:
1. A screw comprising:
a head;
a shank extending from the head and defining a longitudinal axis, with the shank having a shank diameter and provided with a first thread thereon, with the first thread defining a major diameter greater than the shank diameter; and
a hole-enlarging portion designed on the shank and featuring no thread thereon, with the hole-enlarging portion having an approximately triangular transverse section and formed with three inclined edges spaced from one another along a circumferential direction of the shank, with a guiding slope defined between any two adjacent inclined edges for forming an approximately triangular sectional profile at a circumference of the hole-enlarging portion, with the three inclined edges defining an edge top diameter based on their edge tops and being greater than the shank diameter, with each inclined edge obliquely extending toward the head relative to a horizontal axis perpendicular to the longitudinal axis, with a direction in which each inclined edge extends toward the head being identical to a direction in which the first thread extends toward the head, wherein a tilt angle at which each inclined edge extends toward the head is greater than a tilt angle at which the first thread extends toward the head.

2. The screw according to claim 1, further comprising:
a screw-in portion designed at a tail end of the shank, with the shank including a front section and a rear section spaced from the front section along the longitudinal axis, with the front section situated between the rear section and the screw-in portion, with the hole-enlarging portion designed at the front section of the shank and adjacent to the screw-in portion.

3. The screw according to claim 2, wherein the hole-enlarging portion is situated between the first thread and the screw-in portion, with the screw-in portion being a drilling tail end with cutting edges, with each inclined edge having a top end spaced from the first thread and has a bottom end spaced from the cutting edges of the drilling tail.

4. The screw according to claim 2, wherein the hole-enlarging portion is situated between the first thread and the screw-in portion, with a second thread formed on the screw-in portion, with each inclined edge having a top end spaced from the first thread and has a bottom end spaced from the second thread of the screw-in portion.

5. The screw according to claim 2, wherein the hole-enlarging portion is situated between the first thread and the screw-in portion, with a second thread formed on the screw-in portion, with each inclined edge having a top end extending to the first thread and has a bottom end extending to the second thread of the screw-in portion.

6. The screw according to claim 1, wherein each inclined edge has a triangular transverse section and includes two lateral sides and a blade-like outer edge connecting the two lateral sides, wherein two adjacent lateral sides of the two adjacent inclined edges are connected to each other, such that three sides of the triangular transverse section of the hole-enlarging portion are formed by three guiding slopes.

7. The screw according to claim 1, wherein the edge top diameter is slightly less than or equal to the major diameter.

8. The screw according to claim 1, wherein the edge top diameter is greater than the major diameter.

9. The screw according to claim 1, wherein the hole-enlarging portion is rolled from the shank directly.

10. The screw according to claim 1, wherein the guiding slope is an inward recess through which a discharging groove is formed.

* * * * *